(12) United States Patent
Rathus et al.

(10) Patent No.: US 8,261,993 B2
(45) Date of Patent: Sep. 11, 2012

(54) METHOD AND APPARATUS FOR ACCESSING ELECTRONIC DATA VIA A FAMILIAR PRINTED MEDIUM

(75) Inventors: Spencer A. Rathus, New York, NY (US); Jeffrey S. Nevid, New York, NY (US)

(73) Assignee: Marshall Feature Recognition, LLC, Marshall, TX (US)

( * ) Notice: Subject to any disclaimer, the term of this patent is extended or adjusted under 35 U.S.C. 154(b) by 96 days.

(21) Appl. No.: 12/590,557

(22) Filed: Nov. 10, 2009

(65) Prior Publication Data

US 2010/0133332 A1   Jun. 3, 2010

Related U.S. Application Data

(60) Continuation-in-part of application No. 11/786,540, filed on Apr. 11, 2007, now Pat. No. 7,712,668, and a continuation-in-part of application No. 11/786,704, filed on Apr. 12, 2007, now Pat. No. 7,703,683, which is a continuation-in-part of application No. 10/943,798, filed on Sep. 17, 2004, now Pat. No. 7,523,868, which is a continuation-in-part of application No. 09/365,961, filed on Aug. 2, 1999, now Pat. No. 6,866,196, which is a continuation-in-part of application No. 08/628,246, filed on Apr. 4, 1996, now Pat. No. 5,932,863, which is a division of application No. 08/250,799, filed on May 25, 1994, now abandoned, said application No. 11/786,540 is a continuation-in-part of application No. 10/943,798.

(51) Int. Cl.
*G06K 7/10* (2006.01)

(52) U.S. Cl. .................... 235/472.01; 235/375
(58) Field of Classification Search .......... 235/472.01–472.03, 462.01–462.25, 235/454, 455, 470, 375, 380, 383

See application file for complete search history.

(56) References Cited

U.S. PATENT DOCUMENTS

| | | |
|---|---|---|
| 3,673,416 A | 6/1972 | Berler |
| 3,705,384 A | 12/1972 | Wahlberg |
| 3,735,350 A | 5/1973 | Lemelson |
| 3,826,900 A | 7/1974 | Moellering |
| 3,976,995 A | 8/1976 | Sebestyen |
| 3,989,929 A | 11/1976 | Trieber |
| 3,991,299 A | 11/1976 | Chadima, Jr. et al. |
| 4,005,388 A | 1/1977 | Morley et al. |
| 4,117,542 A | 9/1978 | Klausner et al. |
| 4,118,687 A | 10/1978 | McWaters et al. |
| 4,141,078 A | 2/1979 | Bridges et al. |
| 4,144,656 A | 3/1979 | Podkopaev et al. |
| 4,201,887 A | 5/1980 | Burns |
| 4,247,908 A | 1/1981 | Lockhart, Jr. et al. |

(Continued)

FOREIGN PATENT DOCUMENTS

DE  2452202  11/1975

(Continued)

*Primary Examiner* — Thien M Le

(74) *Attorney, Agent, or Firm* — Ward & Zinna, LLC

(57) ABSTRACT

The disclosed methods and apparatus relate generally to the electronics media industry, such as cable television (CATV), home shopping services, on-line computer services and computer memory applications. These methods and apparatus allow a user to access and make use of electronic media input and output devices by reference to and/or utilization of standard printed matter, such as magazines, textbooks, or any other printed matter that can be correlated to electronic media.

25 Claims, 10 Drawing Sheets

U.S. PATENT DOCUMENTS

| | | |
|---|---|---|
| 4,251,798 A | 2/1981 | Swartz et al. |
| 4,270,182 A | 5/1981 | Asija |
| 4,283,621 A | 8/1981 | Pembroke |
| 4,286,145 A | 8/1981 | Palmer |
| 4,286,146 A | 8/1981 | Uno et al. |
| 4,335,302 A | 6/1982 | Robillard |
| 4,359,633 A | 11/1982 | Bianco |
| 4,360,798 A | 11/1982 | Swartz et al. |
| 4,365,148 A | 12/1982 | Whitney |
| 4,418,277 A | 11/1983 | Tremmel et al. |
| 4,419,573 A | 12/1983 | von Geldern |
| 4,437,127 A | 3/1984 | Hirose |
| 4,438,432 A | 3/1984 | Hurcum |
| 4,460,120 A | 7/1984 | Shepard et al. |
| 4,463,970 A | 8/1984 | Kaule et al. |
| 4,465,926 A | 8/1984 | Apitz et al. |
| 4,475,153 A | 10/1984 | Kihara et al. |
| 4,481,412 A | 11/1984 | Fields |
| 4,488,035 A | 12/1984 | Withnall et al. |
| 4,492,164 A | 1/1985 | Cassanas et al. |
| 4,500,880 A | 2/1985 | Gomersall et al. |
| 4,517,410 A | 5/1985 | Williams et al. |
| 4,528,643 A | 7/1985 | Freeny, Jr. |
| 4,588,881 A | 5/1986 | Pejas et al. |
| 4,601,573 A | 7/1986 | Utsugi |
| 4,609,283 A | 9/1986 | Murata et al. |
| 4,609,358 A | 9/1986 | Sangster |
| 4,628,193 A | 12/1986 | Blum |
| 4,639,606 A | 1/1987 | Boles et al. |
| 4,654,482 A | 3/1987 | DeAngelis |
| 4,654,514 A | 3/1987 | Watson et al. |
| 4,659,213 A | 4/1987 | Matsumoto |
| 4,672,658 A | 6/1987 | Kavehrad et al. |
| 4,682,014 A | 7/1987 | Iwama |
| 4,711,994 A | 12/1987 | Greenberg |
| 4,723,212 A | 2/1988 | Mindrum et al. |
| 4,734,858 A | 3/1988 | Schlafly |
| 4,751,500 A | 6/1988 | Minasy et al. |
| 4,757,348 A | 7/1988 | Rourke et al. |
| 4,780,599 A | 10/1988 | Baus |
| 4,789,983 A | 12/1988 | Acampora et al. |
| 4,793,813 A | 12/1988 | Bitzer et al. |
| 4,797,911 A | 1/1989 | Szlam et al. |
| 4,812,879 A | 3/1989 | Suzuki |
| 4,813,350 A | 3/1989 | Drillick |
| 4,820,167 A | 4/1989 | Nobles et al. |
| 4,825,058 A | 4/1989 | Poland |
| 4,829,540 A | 5/1989 | Waggener, Sr. et al. |
| 4,831,610 A | 5/1989 | Hoda et al. |
| 4,833,308 A | 5/1989 | Humble |
| 4,839,507 A | 6/1989 | May |
| 4,841,132 A | 6/1989 | Kajitani et al. |
| 4,850,009 A | 7/1989 | Zook et al. |
| 4,855,725 A | 8/1989 | Fernandez |
| 4,866,756 A | 9/1989 | Crane et al. |
| 4,868,375 A | 9/1989 | Blanford |
| 4,897,865 A | 1/1990 | Canuel |
| 4,901,073 A | 2/1990 | Kibrick |
| 4,910,672 A | 3/1990 | Off et al. |
| 4,916,441 A | 4/1990 | Gombrich |
| 4,924,078 A | 5/1990 | Sant'Anselmo et al. |
| 4,933,538 A | 6/1990 | Heiman et al. |
| 4,937,853 A | 6/1990 | Brule et al. |
| 4,943,995 A | 7/1990 | Daudelin et al. |
| 4,947,028 A | 8/1990 | Gorog |
| 4,952,785 A | 8/1990 | Kikuda |
| 4,954,699 A | 9/1990 | Coffey et al. |
| 4,959,530 A | 9/1990 | O'Connor |
| 4,984,155 A | 1/1991 | Geier et al. |
| 4,992,824 A | 2/1991 | Plummer |
| 4,992,940 A | 2/1991 | Dworkin |
| 5,002,491 A | 3/1991 | Abrahamson et al. |
| 5,003,577 A | 3/1991 | Ertz et al. |
| 5,021,984 A | 6/1991 | Meade et al. |
| 5,027,196 A | 6/1991 | Ono et al. |
| 5,029,183 A | 7/1991 | Tymes |
| 5,031,098 A | 7/1991 | Miller et al. |
| 5,038,023 A | 8/1991 | Saliga |
| 5,047,614 A | 9/1991 | Bianco |
| 5,051,779 A | 9/1991 | Hikawa |
| 5,080,399 A | 1/1992 | Olson |
| 5,083,271 A | 1/1992 | Thacher et al. |
| 5,093,873 A | 3/1992 | Takahashi |
| 5,108,052 A | 4/1992 | Malewicki et al. |
| 5,111,196 A | 5/1992 | Hunt |
| 5,115,326 A | 5/1992 | Burgess et al. |
| 5,119,188 A | 6/1992 | McCalley et al. |
| 5,126,547 A | 6/1992 | Norman, Jr. |
| 5,142,662 A | 8/1992 | Gump et al. |
| 5,148,297 A | 9/1992 | Ishii et al. |
| 5,151,687 A | 9/1992 | Younger |
| 5,157,687 A | 10/1992 | Tymes |
| 5,158,310 A | 10/1992 | Tannehill et al. |
| 5,163,007 A | 11/1992 | Slilaty |
| 5,168,303 A | 12/1992 | Ikenoue et al. |
| 5,173,851 A | 12/1992 | Off et al. |
| 5,180,192 A | 1/1993 | Herbert |
| 5,181,062 A | 1/1993 | Kazumi |
| 5,185,857 A | 2/1993 | Rozmanith et al. |
| 5,189,291 A | 2/1993 | Siemiatkowski |
| 5,198,644 A | 3/1993 | Pfeiffer et al. |
| 5,204,813 A | 4/1993 | Samph et al. |
| 5,211,287 A | 5/1993 | Weisburn et al. |
| 5,222,157 A | 6/1993 | Yoneda et al. |
| 5,222,624 A | 6/1993 | Burr |
| 5,229,584 A | 7/1993 | Erickson |
| 5,235,509 A | 8/1993 | Mueller et al. |
| 5,237,156 A | 8/1993 | Konishi et al. |
| 5,237,157 A | 8/1993 | Kaplan |
| 5,239,487 A | 8/1993 | Horejsi et al. |
| 5,243,174 A | 9/1993 | Veeneman et al. |
| 5,250,789 A | 10/1993 | Johnsen |
| 5,250,790 A | 10/1993 | Melitsky et al. |
| 5,260,553 A | 11/1993 | Rockstein et al. |
| 5,262,860 A | 11/1993 | Fitzpatrick et al. |
| 5,280,498 A | 1/1994 | Tymes et al. |
| 5,280,609 A | 1/1994 | MacPhail |
| 5,284,164 A | 2/1994 | Andrews et al. |
| 5,287,181 A | 2/1994 | Holman |
| 5,287,266 A | 2/1994 | Malec et al. |
| 5,288,976 A | 2/1994 | Citron et al. |
| 5,288,977 A | 2/1994 | Amendolia et al. |
| 5,292,004 A | 3/1994 | Cesarini |
| 5,295,064 A | 3/1994 | Malec et al. |
| 5,295,836 A | 3/1994 | Ryu et al. |
| 5,296,688 A | 3/1994 | Hamilton et al. |
| 5,302,990 A | 4/1994 | Satoh et al. |
| 5,304,786 A | 4/1994 | Pavlidis et al. |
| 5,310,349 A | 5/1994 | Daniels et al. |
| 5,313,052 A | 5/1994 | Watanabe |
| 5,315,098 A | 5/1994 | Tow |
| 5,319,454 A | 6/1994 | Schutte |
| 5,319,542 A | 6/1994 | King et al. |
| 5,324,922 A | 6/1994 | Roberts |
| 5,329,106 A | 7/1994 | Hone et al. |
| 5,331,137 A | 7/1994 | Swartz |
| 5,331,547 A | 7/1994 | Laszlo |
| 5,334,821 A | 8/1994 | Campo et al. |
| 5,337,361 A | 8/1994 | Wang et al. |
| 5,339,412 A | 8/1994 | Fueki |
| 5,340,966 A | 8/1994 | Morimoto |
| 5,340,971 A | 8/1994 | Rockstein et al. |
| 5,340,973 A | 8/1994 | Knowles et al. |
| 5,345,071 A | 9/1994 | Dumont |
| 5,351,285 A | 9/1994 | Katz |
| 5,353,219 A | 10/1994 | Mueller et al. |
| 5,368,129 A | 11/1994 | Von Kohorn |
| 5,369,571 A | 11/1994 | Metts |
| 5,382,779 A | 1/1995 | Gupta |
| 5,383,029 A | 1/1995 | Kojima |
| 5,385,371 A | 1/1995 | Izawa |
| 5,385,475 A | 1/1995 | Sudman et al. |
| 5,386,298 A | 1/1995 | Bronnenberg et al. |
| 5,387,783 A | 2/1995 | Mihm et al. |
| 5,397,156 A | 3/1995 | Schach et al. |
| 5,397,410 A | 3/1995 | Handly |
| 5,398,336 A | 3/1995 | Tantry et al. |

| | | | | | | |
|---|---|---|---|---|---|---|
| 5,401,944 A | 3/1995 | Bravman | | 5,905,251 A | 5/1999 | Knowles |
| 5,404,001 A | 4/1995 | Bard et al. | | 5,913,210 A | 6/1999 | Call |
| 5,410,642 A | 4/1995 | Hakamatsuka et al. | | 5,918,214 A | 6/1999 | Perkowski |
| 5,412,191 A | 5/1995 | Baitz et al. | | 5,932,863 A | 8/1999 | Rathus et al. |
| 5,414,252 A | 5/1995 | Shinoda et al. | | 5,933,829 A | 8/1999 | Durst et al. |
| 5,418,713 A | 5/1995 | Allen | | 5,938,727 A | 8/1999 | Ikeda |
| 5,420,403 A | 5/1995 | Allum et al. | | 5,940,595 A | 8/1999 | Reber et al. |
| 5,420,943 A | 5/1995 | Mak | | 5,948,040 A | 9/1999 | DeLorme et al. |
| 5,424,524 A | 6/1995 | Ruppert et al. | | 5,950,173 A | 9/1999 | Perkowski |
| 5,430,555 A | 7/1995 | Sawada et al. | | 5,963,915 A | 10/1999 | Kirsch |
| 5,450,491 A | 9/1995 | McNair | | 5,963,916 A | 10/1999 | Kaplan |
| 5,451,998 A | 9/1995 | Hamrick | | 5,971,277 A | 10/1999 | Cragun et al. |
| 5,452,379 A | 9/1995 | Poor | | 5,978,013 A | 11/1999 | Jones et al. |
| 5,459,304 A | 10/1995 | Eisenmann | | 5,978,648 A | 11/1999 | George et al. |
| 5,465,291 A | 11/1995 | Barrus et al. | | 5,978,773 A | 11/1999 | Hudetz et al. |
| 5,469,371 A | 11/1995 | Bass | | 5,979,757 A | 11/1999 | Tracy et al. |
| 5,477,042 A | 12/1995 | Wang | | 5,984,366 A | 11/1999 | Priddy |
| 5,478,990 A | 12/1995 | Montanari et al. | | 5,991,601 A | 11/1999 | Anderson |
| 5,483,052 A | 1/1996 | Smith, III et al. | | 5,992,752 A | 11/1999 | Wilz, Sr. et al. |
| 5,484,992 A | 1/1996 | Wilz et al. | | 5,995,105 A | 11/1999 | Reber et al. |
| 5,485,176 A | 1/1996 | Ohara et al. | | 6,002,491 A | 12/1999 | Li et al. |
| 5,490,217 A | 2/1996 | Wang et al. | | 6,003,774 A | 12/1999 | Bard et al. |
| 5,493,355 A | 2/1996 | Kazami | | 6,012,102 A | 1/2000 | Shachar |
| 5,500,681 A | 3/1996 | Jones | | 6,014,090 A | 1/2000 | Rosen et al. |
| 5,505,494 A | 4/1996 | Belluci et al. | | 6,027,024 A | 2/2000 | Knowles |
| 5,506,697 A | 4/1996 | Li et al. | | 6,032,195 A | 2/2000 | Reber et al. |
| 5,513,264 A | 4/1996 | Wang et al. | | 6,045,048 A | 4/2000 | Wilz, Sr. et al. |
| 5,541,394 A | 7/1996 | Kouchi et al. | | 6,064,832 A | 5/2000 | Sato et al. |
| 5,551,011 A | 8/1996 | Danby et al. | | 6,064,979 A | 5/2000 | Perkowski |
| 5,551,021 A | 8/1996 | Harada et al. | | 6,072,186 A | 6/2000 | Yokonuma et al. |
| 5,555,496 A | 9/1996 | Tackbary et al. | | 6,076,733 A | 6/2000 | Wilz, Sr. et al. |
| 5,559,714 A | 9/1996 | Banks et al. | | 6,085,124 A | 7/2000 | Choi |
| 5,563,955 A | 10/1996 | Bass et al. | | 6,085,976 A | 7/2000 | Sehr |
| 5,568,136 A | 10/1996 | Hochstein et al. | | 6,095,418 A | 8/2000 | Swartz et al. |
| 5,569,868 A | 10/1996 | Leung | | 6,098,065 A | 8/2000 | Skillen et al. |
| 5,570,291 A | 10/1996 | Dudle et al. | | 6,108,656 A | 8/2000 | Durst et al. |
| 5,578,797 A | 11/1996 | Hewitt et al. | | 6,119,935 A | 9/2000 | Jelen et al. |
| 5,590,173 A | 12/1996 | Beasley | | 6,122,403 A | 9/2000 | Rhoads |
| 5,594,226 A | 1/1997 | Stegar | | 6,148,331 A | 11/2000 | Parry |
| 5,594,809 A | 1/1997 | Kopec et al. | | 6,149,441 A | 11/2000 | Pellegrino et al. |
| 5,604,640 A | 2/1997 | Zipf et al. | | 6,152,369 A | 11/2000 | Wilz, Sr. et al. |
| 5,612,868 A | 3/1997 | Off et al. | | 6,154,738 A | 11/2000 | Call |
| 5,615,123 A | 3/1997 | Davidson et al. | | 6,157,314 A | 12/2000 | Loftus |
| 5,623,552 A | 4/1997 | Lane | | 6,164,534 A | 12/2000 | Rathus et al. |
| 5,625,770 A | 4/1997 | Nomura | | 6,199,048 B1 | 3/2001 | Hudetz et al. |
| 5,635,694 A | 6/1997 | Tuhro | | 6,213,401 B1 | 4/2001 | Brown |
| 5,640,002 A | 6/1997 | Ruppert et al. | | 6,226,412 B1 | 5/2001 | Schwab |
| 5,640,193 A | 6/1997 | Wellner | | 6,246,337 B1 | 6/2001 | Rosenberg et al. |
| 5,640,726 A | 6/1997 | Fichner-Rathus | | 6,247,047 B1 | 6/2001 | Wolff |
| 5,644,408 A | 7/1997 | Li et al. | | 6,269,336 B1 | 7/2001 | Ladd et al. |
| 5,663,748 A | 9/1997 | Huffman et al. | | 6,269,342 B1 | 7/2001 | Brick et al. |
| 5,671,282 A | 9/1997 | Wolff et al. | | 6,270,351 B1 | 8/2001 | Roper |
| 5,680,528 A | 10/1997 | Korszun | | 6,286,036 B1 | 9/2001 | Rhoads |
| 5,682,540 A | 10/1997 | Klotz, Jr. et al. | | 6,311,214 B1 | 10/2001 | Rhoads |
| 5,721,788 A | 2/1998 | Powell et al. | | 6,313,732 B1 | 11/2001 | DeLuca et al. |
| 5,739,512 A | 4/1998 | Tognazzini | | 6,314,457 B1 | 11/2001 | Schena et al. |
| 5,751,590 A | 5/1998 | Cannon et al. | | 6,321,991 B1 | 11/2001 | Knowles |
| 5,767,496 A | 6/1998 | Swartz et al. | | 6,321,992 B1 | 11/2001 | Knowles et al. |
| 5,774,664 A | 6/1998 | Hidary et al. | | 6,330,244 B1 | 12/2001 | Swart et al. |
| 5,774,874 A | 6/1998 | Veeneman et al. | | 6,331,864 B1 | 12/2001 | Coco et al. |
| 5,778,181 A | 7/1998 | Hidary et al. | | 6,338,434 B1 | 1/2002 | Wil, Sr. et al. |
| 5,794,217 A | 8/1998 | Allen | | 6,340,931 B1 | 1/2002 | Harrison et al. |
| 5,797,330 A | 8/1998 | Li | | 6,345,764 B1 | 2/2002 | Knowles |
| 5,801,944 A | 9/1998 | Kara | | 6,353,772 B1 | 3/2002 | Silverbrook |
| 5,804,803 A | 9/1998 | Cragun et al. | | 6,373,551 B2 | 4/2002 | Manico et al. |
| 5,821,728 A | 10/1998 | Schwind | | 6,375,078 B1 | 4/2002 | Russell et al. |
| 5,828,730 A | 10/1998 | Zebryk et al. | | 6,377,986 B1 | 4/2002 | Philyaw et al. |
| 5,841,978 A | 11/1998 | Rhoads | | 6,381,582 B1 | 4/2002 | Walker et al. |
| 5,848,413 A | 12/1998 | Wolff | | 6,384,744 B1 | 5/2002 | Philyaw et al. |
| 5,857,156 A | 1/1999 | Anderson | | 6,385,583 B1 | 5/2002 | Ladd et al. |
| 5,862,260 A | 1/1999 | Rhoads | | 6,386,453 B1 | 5/2002 | Russell et al. |
| 5,866,888 A | 2/1999 | Bravman et al. | | 6,421,675 B1 | 7/2002 | Ryan et al. |
| 5,869,819 A | 2/1999 | Knowles et al. | | 6,446,871 B1 | 9/2002 | Buckley et al. |
| 5,870,030 A | 2/1999 | DeLuca et al. | | 6,448,979 B1 | 9/2002 | Schena et al. |
| 5,870,546 A | 2/1999 | Kirsch | | 6,453,301 B1 | 9/2002 | Niwa |
| 5,872,589 A | 2/1999 | Morales | | 6,547,726 B2 | 4/2003 | Pratt et al. |
| 5,902,353 A | 5/1999 | Reber et al. | | 6,560,741 B1 | 5/2003 | Gerety et al. |
| 5,903,729 A | 5/1999 | Reber et al. | | 6,568,595 B1 | 5/2003 | Russell et al. |
| 5,905,248 A * | 5/1999 | Russell et al. ......... 235/462.15 | | 6,641,037 B2 | 11/2003 | Williams |

| | | |
|---|---|---|
| D483,806 S | 12/2003 | Fermgard |
| 6,719,470 B2 | 4/2004 | Berhin |
| 6,753,883 B2 | 6/2004 | Schena et al. |
| 6,783,070 B2 | 8/2004 | Faria et al. |
| 6,796,492 B1 | 9/2004 | Gatto |
| 6,824,057 B2 | 11/2004 | Rathus et al. |
| 6,827,256 B2 | 12/2004 | Stobbe |
| 6,827,259 B2 | 12/2004 | Rathus et al. |
| 6,827,267 B2 | 12/2004 | Rathus et al. |
| 6,827,273 B2 | 12/2004 | Wilz et al. |
| 6,830,187 B2 | 12/2004 | Rathus et al. |
| 6,830,188 B2 | 12/2004 | Rathus et al. |
| 6,834,804 B2 | 12/2004 | Rathus et al. |
| D500,795 S | 1/2005 | Andersson et al. |
| 6,843,411 B2 | 1/2005 | Rathus et al. |
| 6,843,419 B2 | 1/2005 | Rathus et al. |
| 6,866,196 B1 | 3/2005 | Rathus et al. |
| 6,873,974 B1 | 3/2005 | Schutzer |
| 6,886,750 B2 | 5/2005 | Rathus et al. |
| 6,951,305 B2 | 10/2005 | Overhultz et al. |
| 6,988,662 B2 | 1/2006 | Russell et al. |
| 7,016,516 B2 | 3/2006 | Rhoads |
| 7,054,461 B2 | 5/2006 | Zeller et al. |
| 7,055,737 B1 | 6/2006 | Tobin et al. |
| 7,143,946 B2 | 12/2006 | Rathus et al. |
| 7,143,947 B2 | 12/2006 | Rathus et al. |
| 7,147,160 B2 | 12/2006 | Rathus et al. |
| 7,154,056 B2 | 12/2006 | Bergqvist et al. |
| 7,155,202 B2 | 12/2006 | Helal |
| 7,162,087 B2 | 1/2007 | Bryborn |
| 7,167,164 B2 | 1/2007 | Ericson et al. |
| 7,180,509 B2 | 2/2007 | Fermgard et al. |
| 7,185,824 B2 | 3/2007 | Hepworth et al. |
| 7,213,763 B2 | 5/2007 | Rathus et al. |
| 7,232,057 B2 | 6/2007 | Rathus et al. |
| 7,269,737 B2 | 9/2007 | Robinson |
| 7,299,971 B2 | 11/2007 | Marggraff et al. |
| 7,314,178 B2 | 1/2008 | Rines et al. |
| 7,333,963 B2 | 2/2008 | Widrow et al. |
| 7,334,728 B2 | 2/2008 | Williams |
| 7,337,968 B2 | 3/2008 | Wilz, Sr. et al. |
| 7,341,191 B2 | 3/2008 | Russell et al. |
| 7,341,456 B2 | 3/2008 | Adams et al. |
| 7,367,049 B1 | 4/2008 | Robinson et al. |
| 7,374,093 B2 | 5/2008 | Rathus et al. |
| 7,383,984 B2 | 6/2008 | Silverbrook et al. |
| 7,392,945 B1 | 7/2008 | Philyaw |
| 7,395,969 B2 | 7/2008 | Rathus et al. |
| 7,398,133 B2 | 7/2008 | Wannier et al. |
| 7,403,968 B2 | 7/2008 | Lee et al. |
| 7,407,099 B1 | 8/2008 | Bhatti et al. |
| 7,451,932 B2 | 11/2008 | Rathus et al. |
| 7,455,233 B2 | 11/2008 | Rathus et al. |
| 7,500,596 B2 | 3/2009 | Rathus et al. |
| 7,523,868 B2 * | 4/2009 | Rathus et al. ............ 235/472.01 |
| 2001/0011276 A1 | 8/2001 | Durst, Jr. et al. |
| 2005/0006466 A1 | 1/2005 | Overhultz et al. |
| 2005/0258961 A1 | 11/2005 | Kimball et al. |
| 2007/0255652 A1 | 11/2007 | Tumminaro et al. |
| 2008/0052168 A1 | 2/2008 | Peters et al. |
| 2010/0023426 A1 | 1/2010 | Wannier et al. |

FOREIGN PATENT DOCUMENTS

| | | |
|---|---|---|
| EP | 0357899 | 3/1990 |
| FR | 2494873 | 5/1982 |
| GB | 2109600 | 6/1981 |
| GB | 2232119 | 12/1990 |
| GB | 2300498 | 11/1995 |
| JP | 60-46684 | 3/1985 |
| JP | 62-98334 | 5/1987 |
| JP | 62264752 | 11/1987 |
| JP | 63203045 | 8/1988 |
| JP | 63296560 | 12/1988 |
| JP | 01226088 | 9/1989 |
| JP | 02103025 | 4/1990 |
| JP | 02127792 | 5/1990 |
| JP | 02279393 | 11/1990 |
| JP | 3060558 | 3/1991 |
| JP | 03151263 | 6/1991 |
| JP | 03174693 | 7/1991 |
| JP | 04-023183 | 1/1992 |
| JP | 4269048 | 9/1992 |
| JP | 06110913 | 4/1994 |
| JP | 6188962 | 7/1994 |
| JP | 6-233159 | 8/1994 |
| JP | 07056941 | 3/1995 |
| JP | 7064169 | 3/1995 |
| JP | 10269326 | 10/1998 |
| JP | 11355699 | 12/1998 |
| JP | 02000267966 | 9/2000 |
| JP | 02000293455 | 10/2000 |
| JP | 2001/142971 | 5/2001 |
| JP | 02001265800 | 9/2001 |
| WO | WO-98/03923 | 1/1998 |
| WO | WO-98/06055 | 2/1998 |
| WO | WO-00/55738 | 9/2000 |

* cited by examiner

METHOD AND APPARATUS FOR ACCESSING ELECTRONIC DATA VIA A FAMILIAR PRINTED MEDIUM

CROSS-REFERENCE TO RELATED APPLICATIONS

This application is a continuation-in-part of application Ser. No. 11/786,540 now U.S. Pat. No. 7,712,668, filed Apr. 11, 2007 and application Ser. No. 11/786,704 now U.S. Pat. No. 7,703,683, filed Apr. 12, 2007, both of which are continuations-in-part of application Ser. No. 10/943,798, now U.S. Pat. No. 7,523,868, filed Sep. 17, 2004, which is a continuation-in-part of application Ser. No. 09/365,961, now U.S. Pat. No. 6,866,196, filed Aug. 2, 1999, which is a continuation-in-part of application Ser. No. 08/628,246, now U.S. Pat. No. 5,932,863, filed Apr. 4, 1996, which is a division of application Ser. No. 08/250,799, filed May 25, 1994, now abandoned.

FIELD OF THE INVENTION

The present invention relates generally to the electronic media industry—such as cable television (CATV), home shopping services, on-line computer services, personal computer applications, and CD-ROM-based multi-media applications—and, more particularly, to a method and apparatus for allowing a user to access and make use of such electronic media services via a device that makes use of a standard book, magazine or other printed work.

BACKGROUND OF THE INVENTION

It is a well-known fact that a large fraction of the population is unfamiliar with the operation or use of modern computer devices. This remains true despite significant advances in user-interface technology, such as mouses, windows, menus and the like. It is commonly said that such technology makes computers "user friendly." However, the modern mouse/window/menu-based user-interface technology has been widely available for several years, and yet it still appears that this technology is not a panacea for computer-phobia. Indeed, studies have shown that a majority of VCR owners cannot operate the simple menu-based interface used to program their VCRs. Thus, there exists a great need for improved user-interface technology, if computer-based electronic media is to become as widely used and accepted as television or radio.

This need for improved user-interface technology will become even greater as technology such as the "information superhighway," continues to be developed and implemented throughout the world. The "information superhighway" permits delivery of high-bandwidth (i.e., full-motion video rate) digital data into millions of homes via fiber optic, cable, Radio Frequency (RF), microwave or satellite links. As such technology continues to improve, in concept, it will permit instant delivery of a virtually limitless selection of commercial, informational, educational and entertainment programming at a user's request. However, without better user-interface technology, the average user may not be capable of enjoying the vast capabilities of such a system. Indeed, it is clear that the number of programming choices available to the user of such technology will be far greater than the number of choices involved in programming a VCR,—a task already demonstrated to be too complicated for the average user of present-day user-interface technology.

In contrast to the difficulty many people encounter in using remote controls and other prior art computer interfaces, printed matter—such as books and magazines—represents an almost universally familiar and non-intimidating medium by which a user can acquire desired information. Even illiterate individuals incapable of reading text can nonetheless peruse pages of printed matter and appreciate the substance of flashy advertisements and the like. Thus, it would be highly desirable to provide a system with the information accessing capabilities of a modern CD-ROM, USB storage device, personal computer, or on-line computer system, and the user-interface simplicity of printed matter.

The prior art includes a class of devices known as "talking books"—see, e.g., U.S. Pat. Nos. 4,636,881 entitled "Talking Book With an Infrared Detector Used to Detect Page Turning"; 4,702,573 entitled "Visual and Audible Activated Work and Method of Forming Same"; 4,778,391 entitled "Sound-Producing Amusement or Educational Devices"; 4,809,246 entitled "Sound Illustrated Book Having Page Indicator Circuit"; 4,990,092 entitled "Talking Book"; and 5,209,665 entitled "Interactive Audio Visual Work"—all of which are incorporated herein by reference. Typically, these "talking books" consist of a book with various sensors which—when activated by touching, page turning, etc.—cause a sound generating means (also embedded within the book) to produce or replay particular sounds. Talking books thus provide an interface for allowing an unsophisticated user (i.e., a child) to access a very primitive computer (i.e., the sound generating means embedded within the book) via familiar printed matter (i.e., the book with embedded sensors). Importantly, however, talking books do not provide a means for interfacing with modern electronic media—such as cable television (CATV), home shopping services, on-line computer services, CD-ROM-based multi-media applications, interactive TV or home computer applications.

One approach to interfacing with these modern electronic media is the "simulated book"—see, e.g., U.S. Pat. No. 4,855,725, entitled "Microprocessor Based Simulated Book," incorporated herein by reference. The "simulated book" is in essence a book-size intelligent graphics terminal. Unlike the talking books, the simulated book is not a self-contained system, but rather transmits commands to and receives data from a CD-ROM equipped personal computer via a wireless link. Thus, the programming that the simulated book can access is not limited to that which can be stored in embedded memory devices, as with the talking books. Importantly, however, the user-interface provided by the simulated book is essentially the conventional computer interface—i.e., keys, pointer, menus, etc. Therefore, a computer-phobic user will likely still find the simulated book intimidating and inaccessible.

A disadvantage of both the talking book and simulated book technologies is that both include relatively costly electronics—i.e., microprocessors, memory, display devices, etc.—as a part of the "book." Thus, these technologies cannot be effectively used to create a "throw-away" interactive magazine, newspaper or advertising brochure.

Thus, there remains a need for a method and apparatus for accessing the vast resources of electronic media using a device as familiar and non-intimidating as printed matter. There remains a further need for such a method and apparatus which utilizes a low cost, throw-away printed matter.

Therefore, in the case of a user accessing electronic data from a remote server, it would be desirable to produce a method by which said user can tailor the retrieval of electronic data without uploading personal profile information or registering a user profile.

Therefore, in the case of a user accessing electronic data from a remote server, it would be desirable to produce a method by which said user can tailor the retrieval of electronic data without uploading personal profile information or registering a user profile.

SUMMARY OF THE INVENTION

One object of the present invention is a method and apparatus for allowing a user to access electronic media via a printed matter.

Another object of the invention is a low cost, throw-away printed matter useful in connection with other objects of the invention.

Still another object of the invention is an improved method of providing electronic media services.

Yet another object of the invention is an intelligent controller for use in connection with the invention.

Still another object of the invention is to individualize the media retrieved by recognizing a machine-recognizable feature in printed matter.

Yet another object of the invention is a method and apparatus for allowing a user to select desired content associated with a printed matter.

Another object of the invention is a method and apparatus for allowing a user to store individual preferences in a user device and later transmit the preferences in order to retrieve desired content associated with a printed matter.

Still another object of the invention is to link stored individual preferences with tailored programming material comprising desired information.

In accordance with one embodiment, the invention comprises: (i) a printed matter having at least one sensor and a transmitter associated therewith; and (ii) an, intelligent controller having a receiver and a means for accessing programming material. A user triggers said sensor through interaction with said printed matter, for example, by touching a particular spot on a page or by turning a page. In response to the triggering of said sensor, the transmitter sends a signal indicative of said sensor. The receiver receives said signal and, in response thereto, the intelligent controller executes a pre-programmed command related to accessing or controlling electronic media or programming. For example, when the user triggers a sensor associated with an advertisement in the printed matter, the intelligent controller may, in response, send a signal via a telephone line, cable connection, wireless modem or cellular link to a remote video server, and thereby cause a promotional program to appear on the user's television.

In accordance with another embodiment, the invention comprises: (i) a printed matter having at least one machine-recognizable feature—such as a bar code or magnetic strip (or any commonly used printed indicia, such as a printed character, symbol or pictorial icon), (ii) a feature recognition unit having a means for recognizing said feature and a transmitter, and (iii) an intelligent controller having a receiver. The user directs the feature recognition unit to a feature on said printed matter. In response, the recognition unit transmits a signal indicative of the identity of the particular feature. The receiver receives the signal and the intelligent controller, in response thereto, executes an appropriate pre-programmed command.

In accordance with another embodiment, the invention comprises: (i) a printed matter having at least one machine-recognizable feature—such as a bar code or magnetic strip (or any commonly used printed indicia, such as a printed character, symbol or pictorial icon), which contains a plurality of distinct data portions, whereby each data portion is embedded with a unique command or link, (ii) a feature recognition unit having a machine recognizing device configured to recognize the feature, a display and a transmitter, and (iii) an intelligent controller having a receiver. The user directs the feature recognition unit to a feature on said printed matter. In response, the recognition unit decodes the plurality of data portions and displays a menu to the user. The menu is preferably comprised of a plurality of different links for the user to select from, wherein each link had been previously encoded in its respective data portion within the machine-recognizable feature. Once the user selects the desired link, the recognition unit transmits a signal indicative of the identity of the particular printed matter and the selection made by the user. The receiver receives the signal and the intelligent controller, in response thereto, executes an appropriate pre-programmed command that causes the desired data to be retrieved and displayed to the user.

In accordance with another embodiment, the invention comprises: (i) a printed matter having at least one machine-recognizable feature—such as a bar code or magnetic strip (or any commonly used printed indicia, such as a printed character, symbol or pictorial icon), (ii) a feature recognition unit having a machine recognizing device configured to recognize the feature, a display, a memory to store individual preferences and a transmitter, and (iii) an intelligent controller having a receiver. The user directs the feature recognition unit to a feature on said printed matter. In response, the recognition unit decodes the machine-recognizable feature and transmits a signal indicative of the identity of the particular printed matter and the individual's preferences. The receiver receives the signal and the intelligent controller, in response thereto, executes an appropriate pre-programmed command that causes data to be retrieved and displayed to the user.

In accordance with an embodiment of the invention, the encoding of a plurality of URLs reflecting a plurality of web sites and/or web pages in the machine recognizable feature and providing said user with the opportunity to select which web site and/or web pages containing user preferred, information he or she would like to access before transmitting a command to the processing means associated with said remote server. In accordance with another embodiment, the invention comprises: (i) a printed matter having at least one machine-recognizable feature and (ii) an intelligent feature recognition unit having means for recognizing said feature, means for associating said recognized feature with a command, and means for issuing said command over a wireless link. In use, the user directs said intelligent feature recognition unit at a feature on said printed matter. In response, said intelligent recognition unit associates said feature with a pre-programmed command and issues a pre-programmed command sequence over a wireless data link to control or access electronic media services. The command may, for example, be transmitted—via an infrared (IR) or ultrasound link—to a CATV control box in the same room, or—via a cellular or satellite link—to the CATV company office.

In accordance with another embodiment, the invention comprises a printed matter having: (i) at least one sensor, (ii) a control module and (iii) a transmitter associated therewith. In response to the triggering of said sensor, said control module directs the transmitter to transmit a command related to accessing or controlling an electronic media service.

Other aspects of the invention relate to methods of providing, accessing or utilizing electronic media services. In accordance with one such aspect, the invention involves: (i) providing a printed matter having at least one sensor associated therewith, (ii) providing an intelligent controller which, in response to the triggering of said sensor, performs a preprogrammed command, and (iii) executing said pre-programmed command to access or control an electronic media.

Another aspect of the invention involves a method of providing electronic media services, which includes the steps of: (i) providing printed matter to a potential customer and (ii) pre-programming an intelligent controller to access or control an electronic media service in response to an event wherein the customer interacts with the printed matter in a particular manner. Advantageously, said printed matter comprises a low cost, throw-away publication.

In accordance with another aspect of the invention, an improved method of providing shop-at-home services includes the steps of: (i) providing to the customer a printed catalogue having at least one sensor or machine-recognizable feature associated therewith, (ii) programming a controller to execute a pre-programmed command in response to an event wherein the customer interacts with said sensor or feature, and (iii) providing a service—e.g., displaying promotional programming on the customer's television, contacting the customer by telephone, establishing a computer "chat" link, etc.—by telephone, cable, or wireless link in response to the execution of said command.

Another aspect of the present invention relates to an improved method of instruction, including the steps of: (i) providing an instructional printed matter—such as a textbook, cookbook, children's book or manual—having at least one sensor or machine-recognizable feature associated therewith, (ii) providing a means, distinct from said textbook or other printed matter, for executing a pre-programmed command in response to an event wherein a reader interacts with said sensor or feature, and (iii) in response to said command, causing or controlling: (a) the electronic delivery or presentation of information related to that in the textbook or other printed matter; and/or (b) the establishment of a communication link to a live tutor or consultant familiar with the subject matter contained in the instructional printed matter.

Another aspect of the invention relates to a low cost, throw-away printed matter—including at least one machine-recognizable feature—adapted for use in connection with the invention.

It is an object of this invention to provide a means for the encoding of a plurality of URLs reflecting a plurality of web sites and/or web pages in the machine recognizable feature and providing said user with the opportunity to select which web site and/or web pages containing user preferred information he or she would like to access before transmitting a command to the processing means associated with said remote server.

It is another object of the present invention to disclose means of individualizing the information retrieved by scanning machine recognizable features in printed matter and other objects or materials for purposes of delivering the most appropriate content.

It is another object of the present invention to disclose means by which a user device interacts with a machine recognizable feature in a printed matter to permit a user to select desired content retrieved from a remote server associated with the particular printed matter.

It is another object of the present invention to disclose means by which individual preferences can be stored and later accessed for the purpose of retrieving specific information relevant to the interests of particular users.

It is another object of the present invention to provide means for automatically linking stored user preferences with tailored programming material comprising desired information.

BRIEF DESCRIPTION OF THE DRAWINGS

The above—as well as other—aspects, objects and features of the present invention will be described in the Detailed Description below, which is intended to be read in conjunction with the following set of drawings, in which.

DETAILED DESCRIPTION OF THE PREFERRED EMBODIMENTS

In this section, the various preferred embodiments of the invention are described from two general perspectives. The first, a "functional" perspective, focuses on the contemplated interactions between the user and the various components—i.e., the printed matter, controller, display unit, etc.—of the invention. This functional description provides the insight needed to implement the software or firmware used in connection with the invention. The second perspective, the "apparatus" view, describes the various technologies that can be used to implement the individual components of the present invention.

The Functional Perspective

Figure 1:
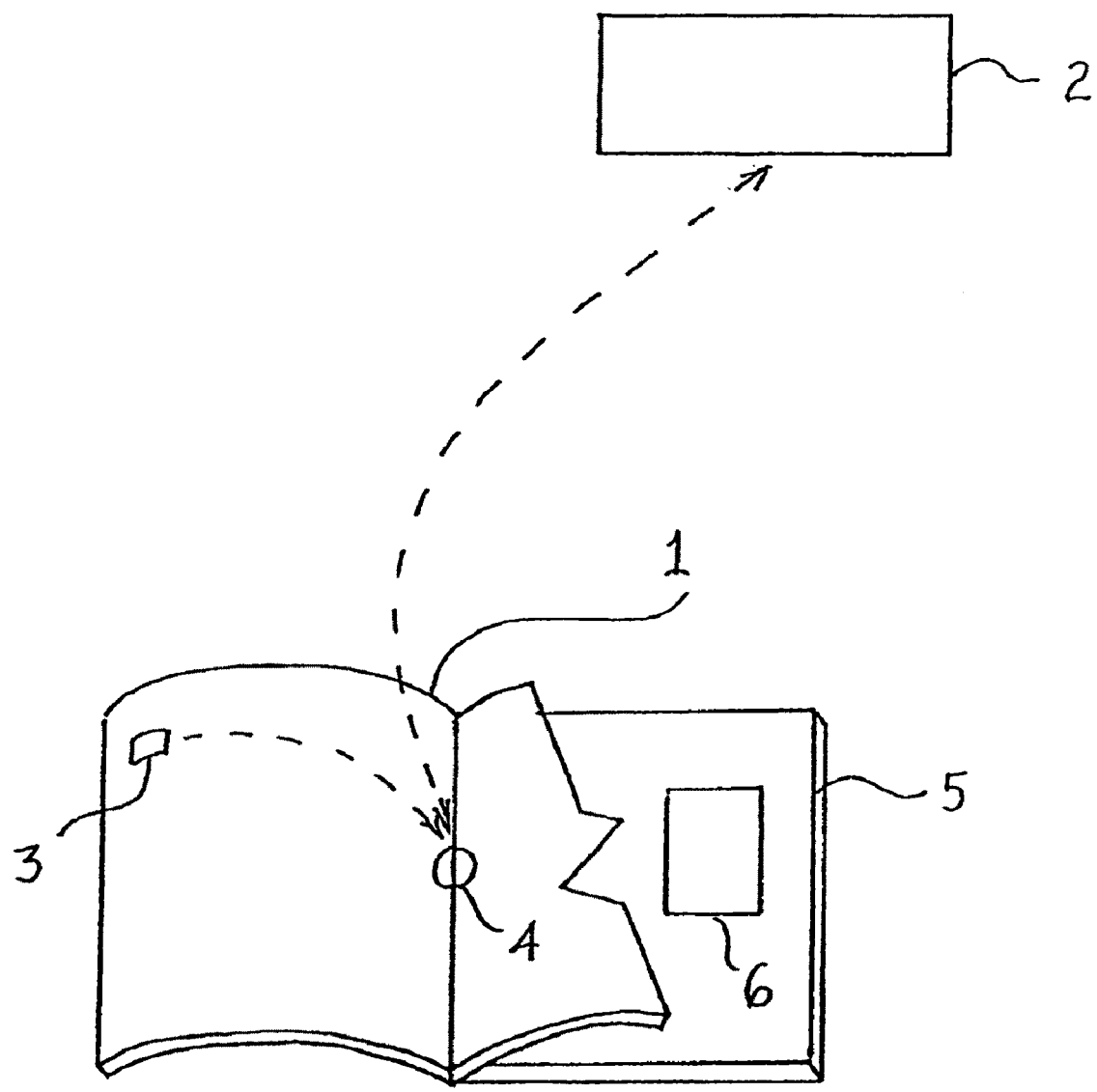
FIG. 1 depicts an embodiment wherein the display unit is embedded within the printed matter.

Reference is now made to FIG. 1, which depicts an embodiment of the invention comprising a printed matter 1 in communication (preferably wireless) with a data server 2.

Printed matter 1 includes at least one sensor 3 and a controller, which preferably includes a microprocessor 4. A stiff or flexible page 5 (any page within a book) holds a display screen 6.

Printed matter 1 can take the form of a book, magazine, manual, musical score, catalog, advertisement, newspaper, telephone or electronic service directory, or other like means. The controller—including microprocessor 4—is preferably embedded within the spine or any other page of printed matter 1.

Display screen 6 can be an LED display, a passive or active matrix LCD display or other like means, and may also have an audio transducer associated therewith.

Sensor 3 is preferably touch sensitive, but can also be a page sensor or a combination of touch and page sensor, as described below. In response to a user's touch, microprocessor 4 causes programming material to be retrieved from data server 2 and displayed on screen 6. Data communication between server 2 and microprocessor 4 may operate via RF cellular, microwave, IR, optical, conductive, telephonic or CATV links, or any combination of these or other like means.

Figure 2:
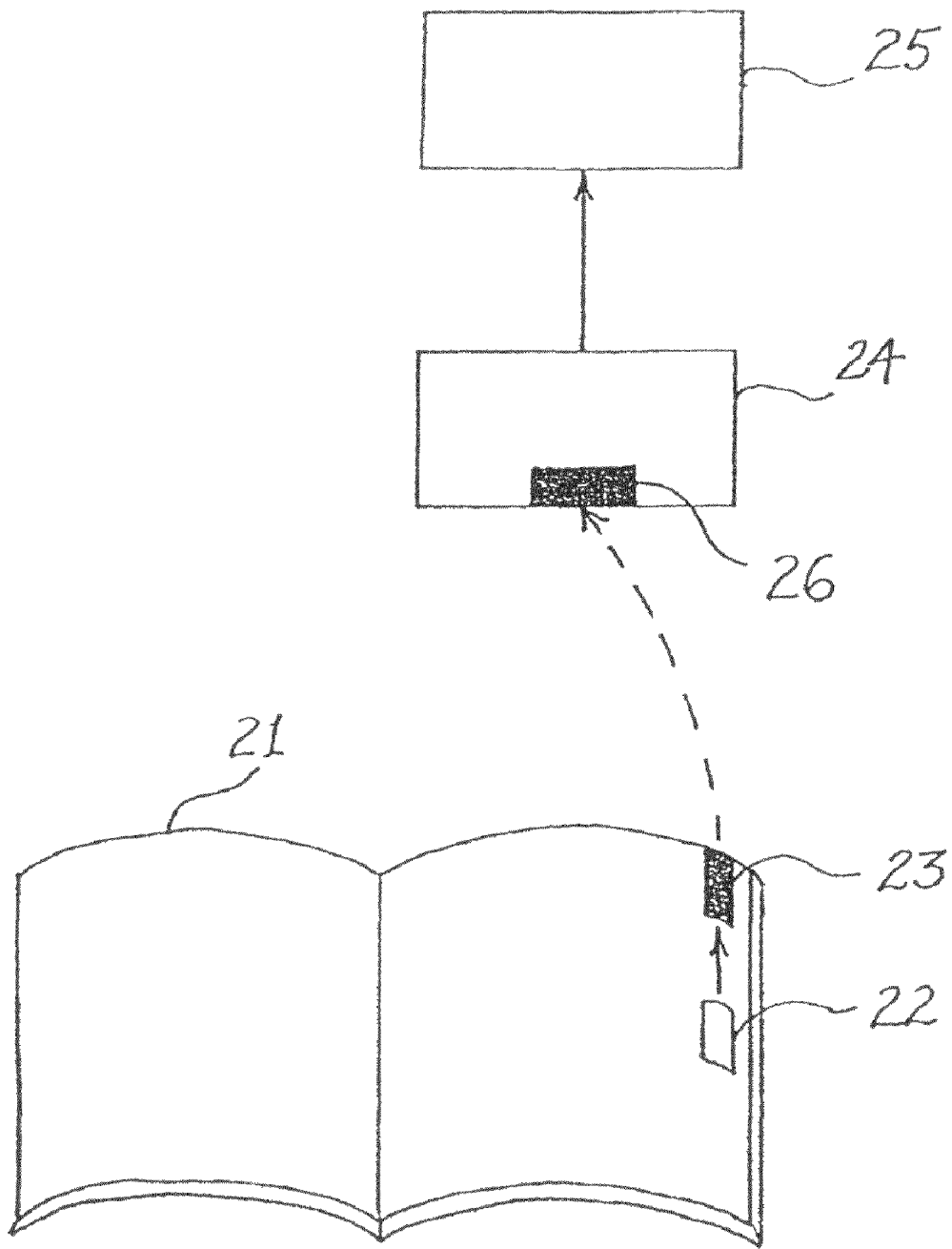
FIG. 2 depicts an embodiment of the invention wherein electronic media is presented on a user's TV set.

Reference is now made to FIG. 2, which depicts an alternative embodiment of the invention comprising a printed matter 21, an intelligent controller 24 and display unit 25. Printed matter 21 includes at least one sensor 22 and a transmitter 23. In response to a user's actuation of sensor 22, transmitter 23 transmits a coded signal indicative of the identity of the actuated sensor. A receiver 26 in intelligent controller 24 receives the coded signal. Controller 24 then identifies the actuated sensor, and initiates display of appropriate programming material on display unit 25 (which can be a TV set or any other means for audio or audiovisual presentation, including but not limited to a personal computer). Programming material preferably derives from a mass storage device—e.g., a magnetic disk, CD-ROM, ROM, flash RAM, PCMCIA card or other memory means—associated with intelligent controller 24 (or with display unit 25). As used herein, the term "memory means" shall also include future storage technologies, such as the recently announced multi-layer CD-ROMs being developed by IBM. See "New I.B.M. Laser Method Stacks Data on Disks," *New York Times*, May 13, 1994.

Figure 3:
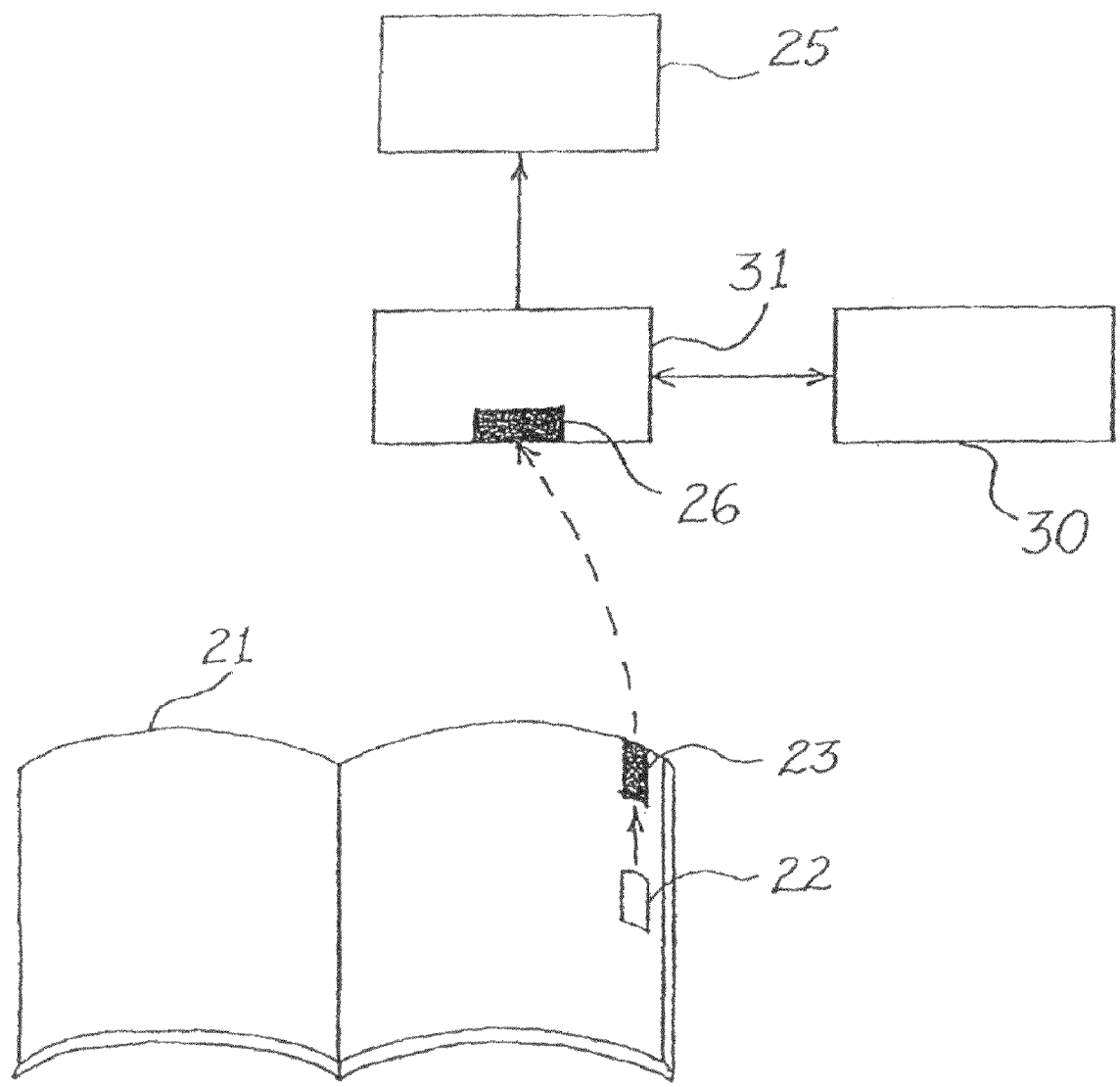
FIG. 3 depicts an embodiment of the invention wherein programming material is accessed from a remote source.

Reference is now made to FIG. 3, which depicts an embodiment of the invention in which intelligent controller 31 derives programming material from a remote server 30. Controller 31 includes means for accessing a remote server 30 of programming material, and preferably further includes means for decompressing compressed programming material received from server 30. In response to a coded signal received by receiver 26, intelligent controller 31 sends an appropriate command to server 30 to select and initiate transfer of appropriate programming material. Controller 31 then receives programming material from remote server 30 and prepares (e.g., decompresses, if necessary) the material for presentation on display unit 25. As with conventional pay-per-view CATV services and on-line computer services, the user is billed according to the volume and/or nature of programming material requested.

Figure 4:
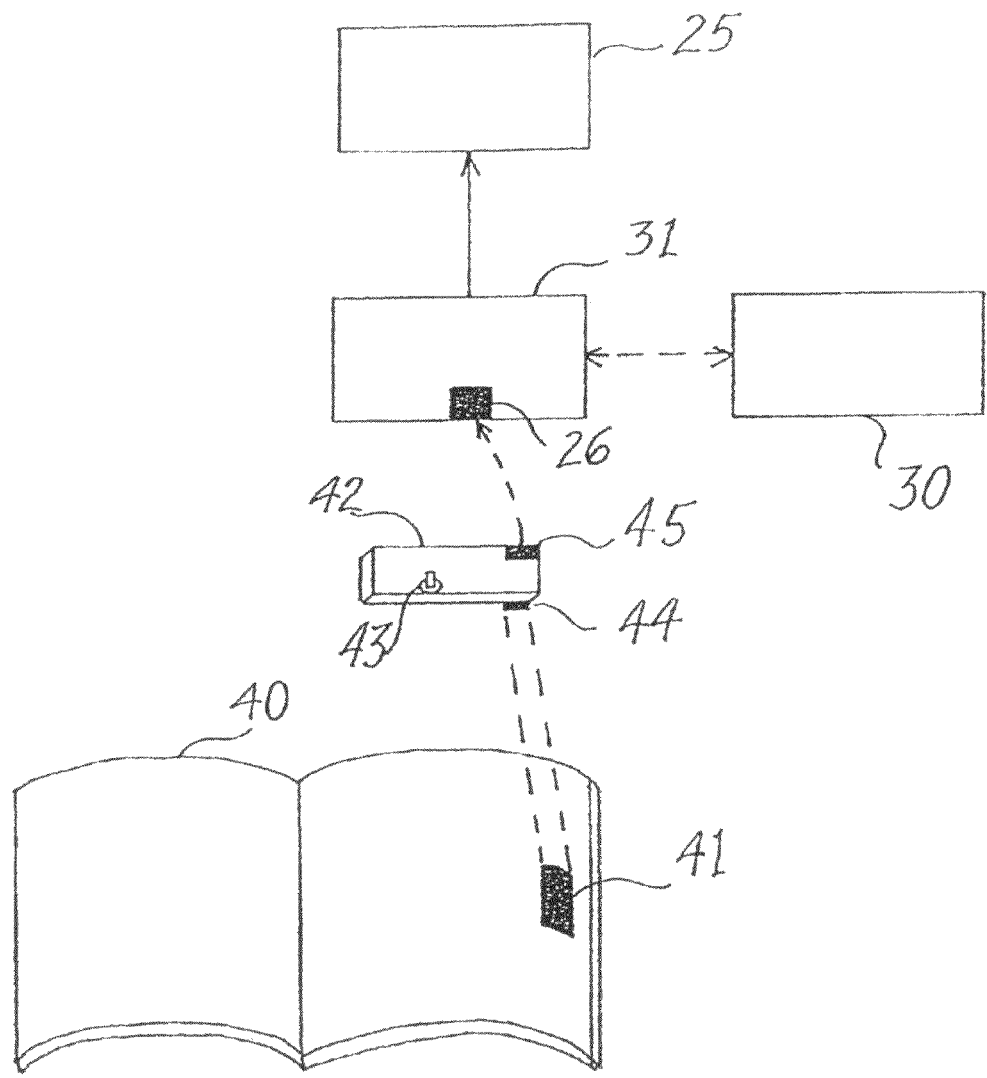
FIG. 4 depicts an embodiment of the invention which includes a feature recognition unit.

Reference is now made to FIG. 4, which depicts an embodiment of the invention including a printed matter 40, a feature recognition unit 42, an intelligent controller 31, a server 30 and a display unit 25. Printed matter 40 includes at least one machine-recognizable feature 41 in the printed work, such as a bar code, invisible, bar code, magnetic code, printed character, symbol or pictorial icon, or other feature.

Feature recognition unit 42 is a hand-held device and includes means 44 for recognizing feature 41, a transmitter 45 and an optional user actuation switch 43. The user directs recognition unit 42 at a feature and depresses actuation switch 43. In response thereto, means 44 for recognizing "reads" (i.e., for a printed feature, scans and identifies) the feature 41, and transmitter 45 transmits a coded signal indicative of the identity of feature 41. The operation of controller 31, server 30 and display unit 25 is otherwise identical or similar to the FIG. 3 embodiment.

Still referring to FIG. 4, use of embedded features 41—as opposed to sensors—lowers the fabrication cost of printed matter 40. Advantageously, printed matter 40 can be a low cost, throw-away publication.

An identification code generated either by recognition unit 42 or intelligent controller 31 allows the user to be billed for his/her use of transmitted material by server 30 and, for commercial applications, allows the advertiser to identify the potential customer.

Figure 4A:
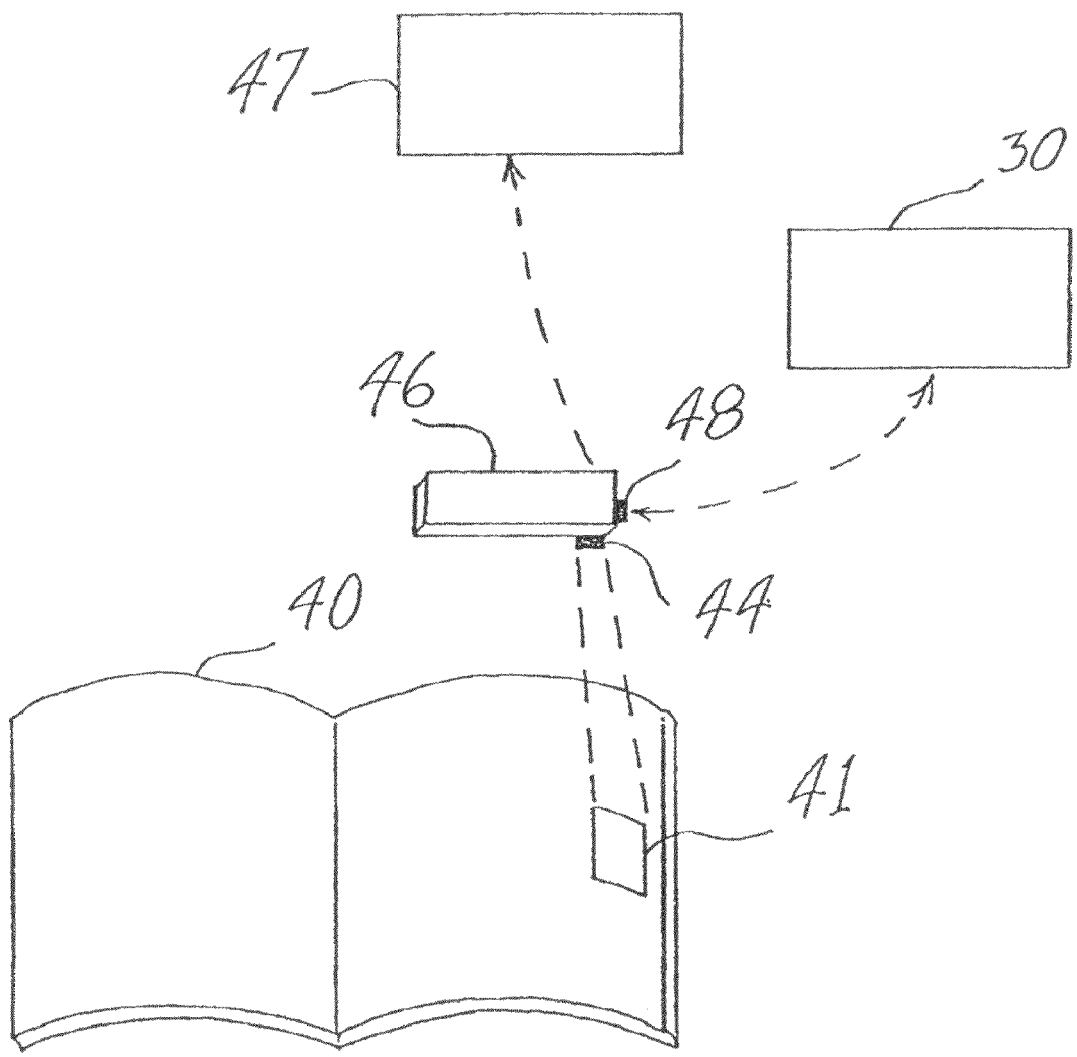
FIG. 4a depicts an embodiment of the invention wherein the feature recognition unit provides an interface between the display unit and a remote source of programming material.

Reference is now made to FIG. 4a, which depicts an embodiment of the invention in which the functions of the intelligent controller are integrated into a recognition/control unit 46. Unit 46 includes means 44 for recognizing a feature 41 and means 48 for accessing—preferably via a cellular RF link—programming material associated with a server 30. In addition, the recognition/control unit 46 optionally includes a microprocessor. Either the recognition/control unit 46 or the display unit 47 may include means for decompressing compressed programming material.

Figure 4B:
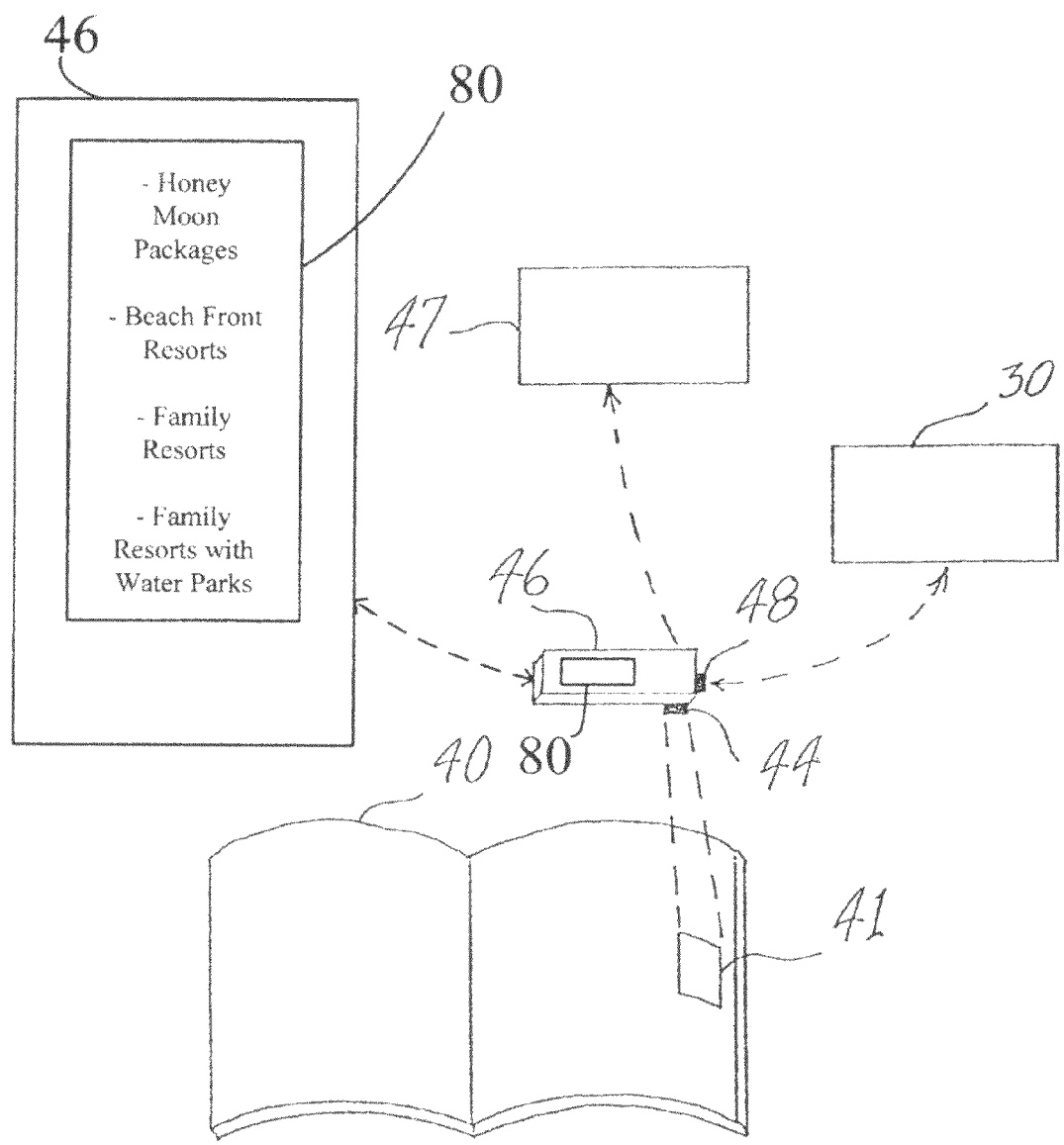
FIG. 4b depicts an embodiment of the invention adapted for wherein the display unit is embedded within feature recognition unit.

Reference is now made to FIG. 4b, which depicts an embodiment of the invention adapted for selecting portions of the information encoded in the machine recognizable features. The embodiment includes the feature recognition unit which is integrated into a recognition/display unit 46. The unit 46 includes means 44 for recognizing a feature 41 and means 48 for accessing programming material associated with a server 30. In addition, the unit 46 includes means 80 for displaying the programming material that was received via the unit 46 or intelligent controller. Additionally, the recognition/display unit 46 optionally includes a microprocessor. The recognition/display unit 46 or intelligent controller may include means for decompressing compressed programming material. A plurality of URLs are displayed on the display 80. The plurality of URLs reflect a plurality of web sites and/or web pages in the machine recognizable feature. The plurality of URLs provide the user with the opportunity to select which web site and/or web pages containing user preferred information he or she would like to access before transmitting a command to the processing means associated with said remote server.

Figure 4C:
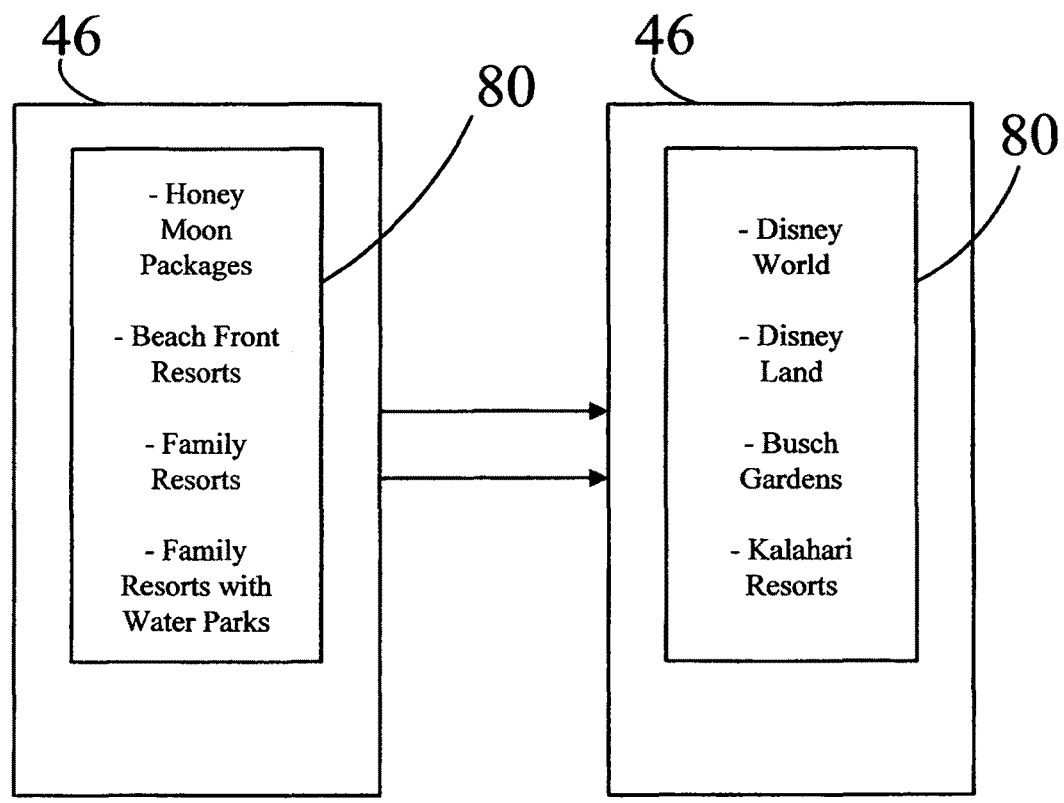
FIG. 4c further depicts an embodiment of the invention adapted for presentation of material selecting portions of the information encoded in the machine recognizable features.

Reference is now made to FIG. 4c, which shows display 80 in two different stages. The plurality of URLs are presented on the left. After the URL that the user is interested in is selected (in this case 'Family Resorts') another list of URLs is shown on the right. This list only contains URLs that are included in the 'Family Resorts' group of URLs. Therefore, not all of the URLs need to be downloaded.

Figure 5:
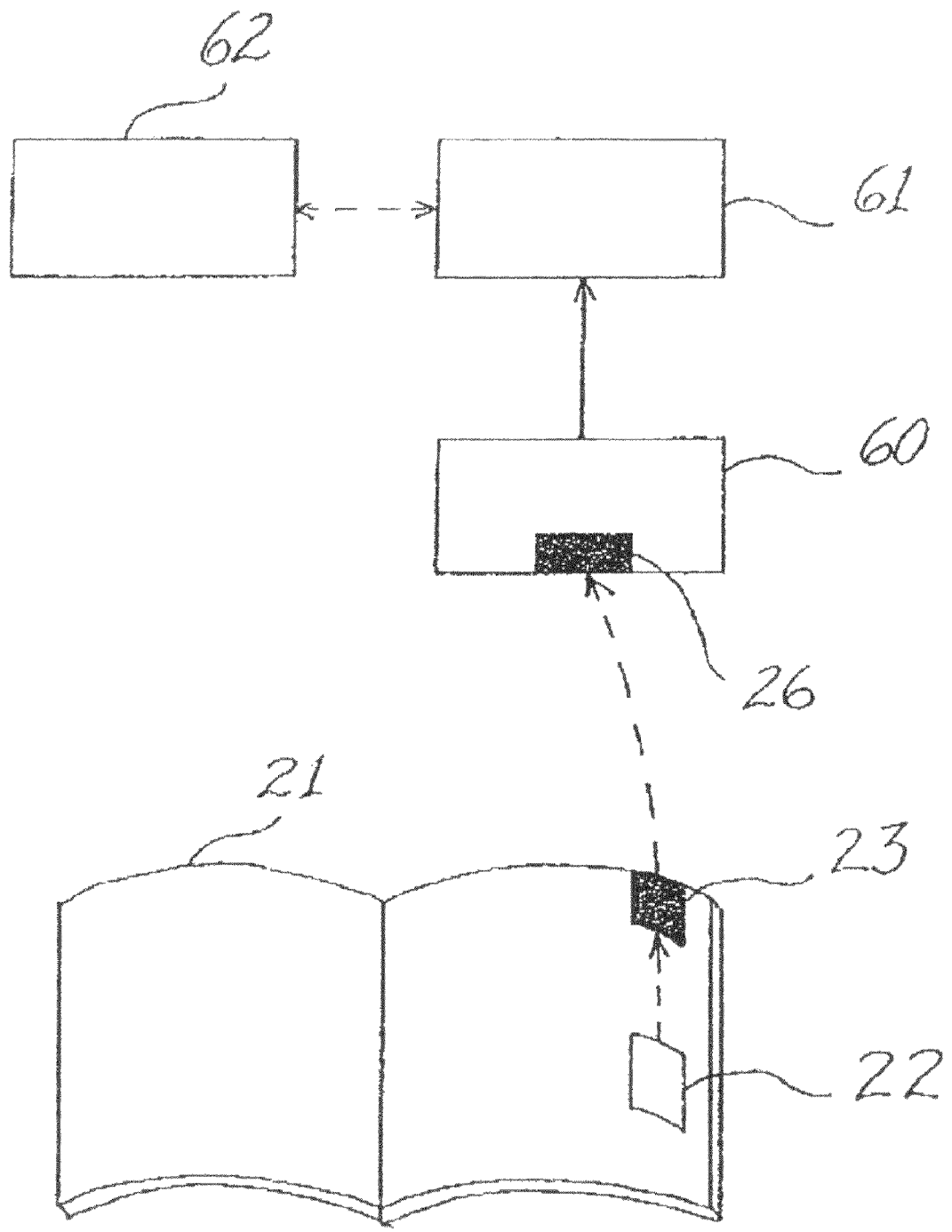
FIG. 5 depicts an embodiment of the invention wherein the display unit comprises a personal computer.

Reference is now made to FIG. 5, which depicts an embodiment of the invention utilizing a personal computer to access and display electronic programming material. In this embodiment, portions of the personal computer provide the functions of the previously-described intelligent controller, while other portions of the computer provide the functions of the display unit. The scope of this invention should not be limited to the traditional notions of Personal Computers. The present invention will find use in conjunction with more non-traditional applications such as WEB-TV®, Video Phones, as well as other chip based technologies. An interface unit 60 includes a receiver 26 for receiving a coded signal from a transmitter 23, representative of an actuated sensor 22 (or, in an alternative embodiment which includes a feature recognition unit, from the feature recognition unit indicative of the selected feature) on printed matter 21. Interface unit 60 connects to personal computer 61 by any conventional means, such as an I/O port, card slot, etc. Personal computer 61 monitors the interface unit 60, and displays (or controls the display of) appropriate programming material selected by the user through his/her interaction with printed matter 21.

Programming material can be stored on personal computer 61—on a ROM, CD-ROM, flash RAM, PCMCIA card, or other disk/card supplied along with printed matter 21—or accessed from a remote data server 62.

Figure 6:
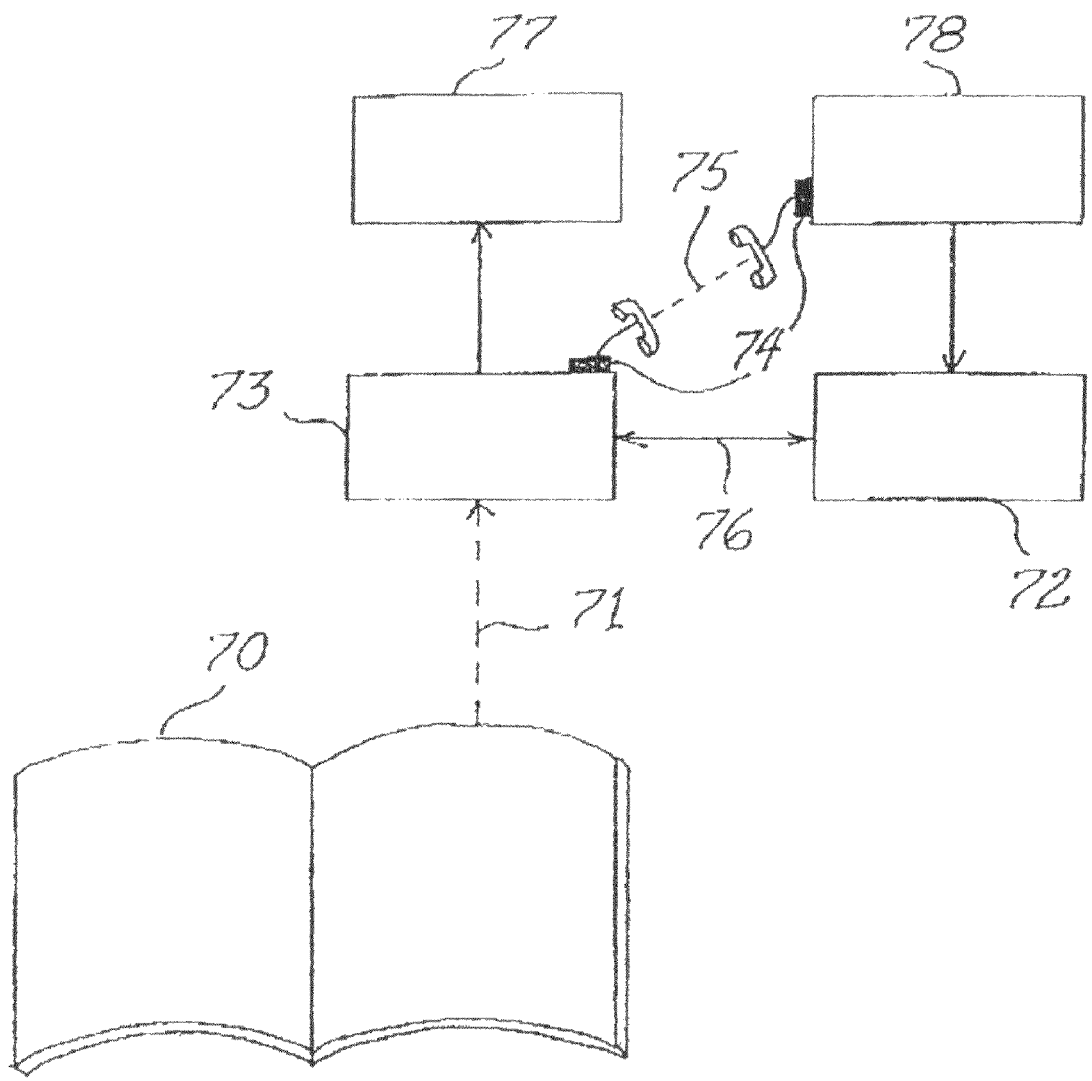
FIG. 6 depicts an embodiment of the invention adapted for commercial and shop-at-home applications.

Reference is now made to FIG. 6, which depicts an embodiment of the invention adapted for commercial and shop-at-home applications. The customer views and interacts with a printed matter 70 (via sensors or a feature recognition unit, both as previously described). Printed matter 70 is preferably a throw-away catalog or advertising brochure listing commercial items, such as programming choices, merchandise, travel or event schedules, or television and/or radio programming schedules. The user interacts with printed matter 70 (i.e., with certain features and/or sensors therein) to cause a coded signal 71 indicative of the customer's selection to be transmitted (either by a transmitter embedded in the printed matter or within a feature recognition unit) to controller 73. In response thereto, controller 73 utilizes a modem/telephone (or other wired or wireless communication) link 74-75 to communicate the customer's selection to a commercial provider's remote office 78 (or to a centralized data bank or information superhighway).

The commercial provider preferably uses a "caller ID" function to identify the customer and can respond in a number of ways: (i) have a representative contact the customer; (ii) send the ordered merchandise or tickets to the customer; (iii) direct a data server 72 to provide programming or additional promotional material via a CATV line 76 to controller 73, which replays the material on the customer's TV set; or (iv) download and execute an interactive merchandise selection program on the customer's personal computer or any other electronic media input, output or sensory stimulating device.

Figure 7:
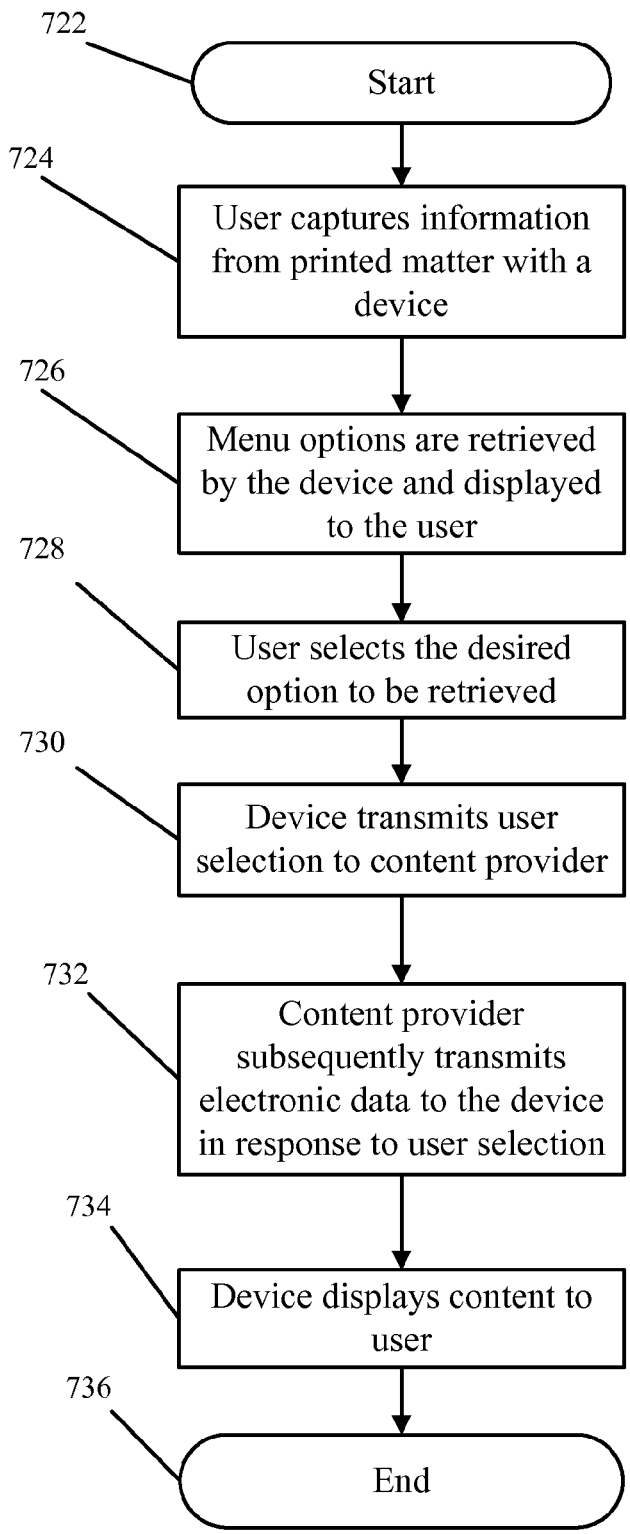
FIG. 7 depicts a flow chart for the embodiment where the user selects portions of the information encoded in the machine recognizable features.

Reference is now made to FIG. 7, which shows a flow chart of an embodiment of the invention wherein a user: (i) selects programming material associated with a feature on a printed matter; and (ii) controls or interacts with a personal computer during the presentation and/or execution of the programming material. The recognition device may be comprised of one of many possible devices already in use within the computer and electronics industry.

After starting in step 722, the user captures information from printed matter in step 724. In step 726, menu options are retrieved by the device and displayed to the user. In step 728, the user selects the desired option to be retrieved e.g., by scrolling through a list displayed on his cell phone display unit and pressing down on one of them. Then in step 730, the device transmits the user selection to the content provider. This is done by transmitting a command sequence to the processor associated with the remote server. Then, in step 732, the content provider transmits electronic data to the device in response to the user's selection. To do this, the command sequence instructs the processor which electronic data to access and also instructs the processor where to send said electronic data. Then in step 734, the device displays the selected content to the user that is related to the printed matter.

In one example shown in FIGS. 4b and 4c, a user sees an advertisement for "Vacation Packages" in a printed matter, such as a newspaper or magazine, that contains a 2D barcode or other printed indicia, such as an icon or symbol. The user may have an interest in a family vacation package to a resort that offers a waterpark. The user engages a digital camera housed in a cell phone to capture a barcode or other indicia in the printed matter, whereupon through a software processing application housed in the cell phone containing the scanning means, a response menu appears on the cell phone's display showing a range of retrievable content, such as "Honeymoon Packages," "Beachfront Resorts," "Family Resorts", "Family Resorts with Waterparks," etc. The user then selects one or more of these response options, initiating a preprogrammed command sequences that causes the desired electronic data to be retrieved from an online source and displayed on the cell phone display.

In another example similar to that shown in FIGS. 4b and 4c, a user sees an advertisement for a movie of interest, or a movie poster, containing a 2D barcode or other printed indicia, such as an icon or symbol. By using the camera in the user's cell phone to capture the barcode or other indicia, the user is presented with a set of response options on the device's display, such as "See Movie Trailer," "Read Reviews," "Find Nearby Theater Locations", and "Order Tickets." The user then selects "See Movie Trailer" and the desired content is displayed on the cell phone display. A prompt may then appear indicating the availability of additional information, such as "Buy Tickets Now". Upon selecting that option, the user is directed to an online ticket purchasing vendor.

Referring now to FIG. 2, a plurality of touch sensors 22 are embedded within the back binding of the printed matter 21. Alternatively, touch sensors 22 can be positioned along inner or outer margins of the binding, or of particular pages, of printed matter 21 (or along an edge of a mounting tray in which a disposable printed matter is placed). Electronics mounted within printed matter 21 (or within a mounting tray) responds to the actuation of a touch sensor 22 and transmits a coded signal indicative of the identity of the actuated sensor.

Advantageously, touch sensors can be combined with page sensors—as described in U.S. Pat. Nos. 5,209,665; 4,990,092; 4,636,881 and 4,809,246, all previously incorporated herein—to provide a larger number of "effective sensors." In this embodiment, each time a sensor is actuated, the electronics within the printed matter also checks the page sensor(s) to determine which page is currently being viewed. The electronics then generates a coded signal that identifies both the sensor actuated and the currently visible page. Thus, each (page, sensor) combination represents, in essence, a single "effective sensor."

The Apparatus Perspective

The various technologies used to implement the individual functional components that comprise a part of this invention are described below.

Touch Pad Technology

Hybrid embodiments combining touch pads and page sensors are also possible. For example, a printed matter might contain a sheet of touch sensors every so many pages, with the page interval being dependent on the stiffness of the pages and the responsiveness of the sensors. That is, if the maximum number of pages through which a user's touch could be reliably detected by a touch sensor was X, then the printed matter would preferably include a sheet of touch sensors every X pages of text.

Intelligent Controllers and Data/Communication Servers

In accordance with several embodiments of the invention, an intelligent controller controls the selection of programming in a video "file server" system. File servers are well known in the art. Generally, as used herein, the term intelligent controller can refer to computer equipment having either: (a) some type of mass storage device, typically a magnetic or magneto-optical disk, that is connected to a network and utilized as central storage for multiple users via the network; and/or (b) some type of network interface which allows establishment of a communication link with other user(s).

Referring to a "file server" type of intelligent controller, the information that is typically stored on such a system consists of binary computer data such as executable programs and corresponding data. Exemplary of the types of corresponding data stored are numbers for spreadsheets, ASCII characters and codes for word processors, and drawing commands for drawing and CAD programs. These or similar types of data do not generally have a time element associated with them, nor do they generally require any extra processing beyond the usual interpretation that is accomplished by the computer program with which they are intended to be used.

In contrast, the playback of audio/video information has a time element associated with its use. Furthermore, the amount of data required to store audio/video program information in "raw" digital form is often prohibitive. Thus, it is common to employ audio/video compression techniques to compress audio/video program information before it is stored. As a result, further processing in the form of decompression and digital-to-analog conversion is required before the real-time viewing of an audio/video program can take place. Decompression may be accomplished through the use of known hardware or software techniques. Digital-to-analog conversion may be required, depending on the type of equipment used for viewing the audio/video program. A known audio/video file server apparatus manufactured and marketed by Protocomm of Trevose, Pa. permits real-time playback of compressed audio/video program information.

Generally, modern audio/video file server systems include: a storage unit for centrally storing compressed digital audio/video program information, a transceiver for receiving compressed digital audio/video program information from an external source over a network (or wireless communication link) to update the stored audio/video program information, a plurality of playback units, each associated with an external playback line and an external playback station, each including a decompression unit, for receiving selected compressed digital audio/video program information from the storage unit, for decompressing the selected compressed digital audio/video program information received from the storage unit, and for playing it in real time over the associated playback line to the associated playback station, a network interface unit for receiving playback requests from the playback units, and a processor for controlling the storage and playback units to play the decompressed selected audio/video program information in real time for viewing by users at selected playback stations.

Such a system is described, for example, in U.S. Pat. No. 5,262,875 entitled "Audio/Video File Server Including Decompression/Playback Means," which is incorporated herein by reference. The '875 system can be adapted to operate in accordance with the present invention by coupling intelligent controller of the present invention with the '875 system's network interface unit (which provides the playback requests to the playback unit). In the '875 system: "Playback may be initiated through a user request from one of the playback stations or through direct interaction with audio/video file server 5. In the latter case, a simple user interface, such as a menu interface, may be employed for selection of the desired program information and the playback station. For example, a menu of the available items of audio/video program information, as named by the user or by the system, may be presented. The user may make a selection through cursor control keys on a keyboard."

In contrast, the present invention permits the user to select and control the presentation of audio/video programming through a familiar printed matter interface, as has been previously described. The present invention thus offers the advantage of nearly universal accessibility.

In accordance with the present invention, multimedia programming is preferably delivered from the file server(s) to the replay unit via an Integrated Service Digital Network (ISDN). U.S. Pat. No. 5,206,859 entitled "ISDN Multimedia Communications System," incorporated herein by reference, describes such a system.

In accordance with the invention, a variety of means can be employed to communicate selection instructions to the video server and to communicate programming material from the server to the user's display unit. Since the selection instructions are very compact (i.e., low bandwidth), these instructions can be communicated via a standard telephone link using an inexpensive, low speed modem. This is similar, for example, to the method cable TV viewers use to select pay-per-view programming from local CATV companies—i.e., the viewer calls a particular toll-free number associated with the desired program, and the CATV office uses a "caller ID" function to determine which customer is to receive the program.

Communication of the programming material from the server to the display unit may require a higher-bandwidth means. No doubt, certain material—such as pricing information for a shop-at-home service or scheduling information for a travel booking service—could be easily transmitted via an inexpensive telephone/modem link. In addition, using the preferred compression/decompression techniques, many multi-media applications could also operate over a conventional telephone link. High quality audio/video programming, however, will likely require a higher bandwidth transmission medium, such as a CATV line, microwave link, DSB link, optical fiber link, cellular radio link, or enhanced bandwidth telephone connection.

Although the invention has been described above with reference to several presently preferred embodiments, such embodiments are merely exemplary and are not intended to define the scope of, or exhaustively enumerate the features of, the present invention. Accordingly, the scope of the invention shall be defined by the following claims. Where a feature or limitation of a preferred embodiment is omitted in a claim, it is the inventors' intent that such claim not be construed to impliedly require the omitted feature or limitation.

What is claimed is:

1. A method for displaying selected programming material to a user using at least one machine recognizable feature within a printed matter and a database comprising programming material associated with the at least one machine recognizable feature, comprising the steps of:

recognizing the at least one machine recognizable feature of the printed matter using a feature recognizing device coupled to a user device, wherein the at least one machine recognizable feature has a plurality of portions of encoded data, and further wherein at least one portion of the plurality of portions comprises a preprogrammed command for executing an interaction with the user device;

identifying encoded data associated with the at least one machine recognizable feature of the printed matter;

presenting a plurality of options on a display;

selecting at least one of the plurality of options;

transmitting, using the user device, data associated with the at least one machine recognizable feature and the at least one option selected to the database;

receiving the selected programming material from the database; and displaying the programming material on the display.

2. The method of claim 1 wherein the interaction comprises displaying selectable options on the display.

3. The method of claim 2 wherein each portion of the plurality of portions of encoded data comprises a link for retrieving programming material.

4. The method of claim 1 wherein the at least one machine recognizable feature is selected from a group consisting of a printed matter, a code, a barcode, a two-dimensional barcode, a QR code, a magnetic strip, an audible audio emitting device, a biometric sample, a watermark, a digital watermark, a transponder, a radio frequency identification device tag, a touch sensor, an infrared tag, and a quantum dot.

5. The method of claim 1 wherein the printed matter is selected from the group consisting of a book, a textbook, a newspaper, an editorial, a letter-to-the-editor, an advertisement, a magazine, a passport, a boarding pass, a real estate listing, an identification card, a smart card, a student identification card, a license, a registration, a receipt, a ticket, a business card, a credit card, a cash card, and a document.

6. The method of claim 1 wherein the user device is selected from a group consisting of a personal computer, a hand-held communications device, a cellular telephone, a camera-enabled cellular telephone, a scanner, a personal digital assistant, an Internet-enabled telephone, an Internet-enabled device, an intelligent terminal, a television, a pager, a simulated book, a laptop computer, and a wireless communications device.

7. The method of claim 1 wherein the at least one machine recognizable feature has associated therewith a data link which is recognized by the user device.

8. The method of claim 7 wherein the data link is selected from the group consisting of an image data link, a video data link, an audio data link, a programming data link, an online data link, a pictorial data link, an electronic data link, an electronic media link, and an "information superhighway" data link.

9. The method of claim 8 wherein the "information superhighway" data link is selected from the group consisting of the Internet, a computer network, a local area network, a wide area network, a wireless network, an Ethernet network, a Radio Frequency cellular network, an Integrated Services Digital Network, a telephone line, and a cable television line.

10. The method of claim 1 wherein the feature recognizing device is selected from the group consisting of a scanner, a camera, a barcode scanner, a code reader, a magnetic stripe reader, a transceiver, a biometric reading device, a watermark reader, a receiver, a radio frequency identification device reader, an infrared reader, a quantum dot reader, an optical reader, and an optical mouse.

11. The method of claim 10 wherein the feature recognizing device is linked to a personal computer or a wireless interface.

12. The method of claim 11 wherein the wireless interface is selected from the group consisting of a cellular telephone, a pager, a wireless personal computer, a personal digital assistant, a wireless device, an Internet accessing device, and a television receiver.

13. The method of claim 1 wherein the database is selected from the group consisting of a local database, a remote database, a remote server, and a network of databases.

14. The method of claim 1 wherein the display is coupled to the user device.

15. A system for displaying programming material to a user, the system comprising:
a printed matter having a machine recognizable feature, wherein said machine recognizable feature has a plurality of portions of encoded data, and further wherein at least one portion of the plurality of portions comprises a preprogrammed command for executing an interaction with a user device;
the user device including:
a feature recognition device configured to recognize said machine recognizable feature,
a display configured to present a plurality of options upon recognizing said machine recognizable feature, and
a transmitter configured to transmit a coded signal upon recognition of said machine recognizable feature and selection of at least one option from said plurality of options; and
an intelligent controller configured to access said programming material in response to receiving said coded signal and cause said programming material to be displayed on said display.

16. A system according to claim 15 wherein said machine recognizable feature has associated therewith a data link which is recognized by said feature recognition device.

17. A system according to claim 16 wherein said data link is selected from the group consisting of an image data link, a video data link, an audio data link, a programming data link, an online data link, a pictorial data link, an electronic data link, an electronic media link, and an "information superhighway" data link.

18. A system according to claim 17 wherein said "information superhighway" data link is selected from the group consisting of the Internet, a computer network, a local area network, a wide area network, a wireless network, an Ethernet network, a Radio Frequency cellular network, an Integrated Services Digital Network, a telephone line, and a cable television line.

19. A system according to claim 15 wherein said printed matter is selected from the group consisting of a book, a textbook, a newspaper, an editorial, a letter-to-the-editor, an advertisement, a magazine, a license, a registration, a passport, a ticket of admission, a boarding pass, a travel ticket, a business card, an identification card, a real estate listing, a commercial document, and an educational document.

20. A system according to claim 15 wherein said machine recognizable feature is selected from the group consisting of a printed matter, a code, a bar code, a two-dimensional bar code, a magnetic strip, a biometric sample, a watermark, a digital watermark, and a transponder.

21. A system according to claim 15 wherein said feature recognition device is selected from the group consisting of a scanner, a camera, a bar code scanner, a code reader, a magnetic stripe reader, a biometric reading device, a watermark reader, a receiver, and a transceiver.

22. A system according to claim 21 wherein said feature recognition device is linked to a personal computer.

23. A system according to claim 21 wherein said feature recognition device is linked to a wireless interface.

24. A system according to claim 23 wherein said wireless interface is at least one selected from the group consisting of a cellular telephone, a pager, a wireless personal computer, a personal digital assistant, an Internet accessing device, and a television receiver.

25. A system according to claim 15 wherein said display comprises at least one selected from the group consisting of a personal computer, a laptop computer, a personal digital planner, an Internet accessing device, a wireless communication device, an intelligent terminal, a mobile telephone, a cellular telephone, a camera-enabled cellular telephone, an Internet enabled telephone, a handheld device, a television, a pager, and a flat panel display.

* * * * *